United States Patent Office 2,762,686
Patented Sept. 11, 1956

2,762,686

PURIFICATION OF CALCIUM CARBONATE IN MOLTEN BATH OF ALKALI METAL CARBONATES AND HYDROXIDES

George L. Cunningham, Cleveland Heights, and John M. Finn, Jr., Shaker Heights, Ohio, assignors, by mesne assignments, to The Sinclair Manufacturing Company, H. M. Sinclair, Jr., trustee, Toledo, Ohio, a partnership No Drawing. Application February 21, 1955,
Serial No. 489,792

7 Claims. (Cl. 23—66)

This invention relates to the preparation of calcium carbonate in pure form and more particularly, to the preparation of finely divided calcium carbonate in high purity from natural deposits of this mineral. In the past, many processes for purifying calcium carbonate or for preparing this finely divided compound in pure form have been developed. These involve generally the reaction of relatively expensive sodium carbonate with calcium chloride and the recovery of the pure calcium carbonate as a finely divided precipitate from an aqueous medium. Such processes suffer from a severe economic disadvantage as compared with the process we have invented insofar as they involve the use of relatively expensive reagents, the handling of large amounts of liquids and tedious filtration, washing, drying and grinding techniques.

We have discovered a method of obtaining high purity precipitated calcium carbonate from ores such as limestone in a simple, direct and inexpensive manner which produces calcium carbonate of a smaller size than that made by the conventional process and which is substantially free from the impurities contained in the limestone or other ores.

We are also able by a variation hereinafter described to control the size of the particles of calcium carbonate at will and by suitable techniques to produce either very fine particles or a size larger than that now commercially available as well as sizes intermediate of these extremes.

The principal object of our invention is to provide a method of producing a better quality of calcium carbonate at a lower cost than has heretofore been possible. A further object is to provide a process in which it is not necessary to reduce the ore to powdered form and in which it is not necessary to break down the original calcium carbonate molecules found in the limestone or other calcium carbonate containing ores. A further object of our invention is to provide a process for the production of finely divided, high purity calcium carbonate which does not require the use of relatively expensive chemicals such as sodium carbonate and calcium chloride.

In accordance with our invention, the disadvantages inherent in the prior art processes are eliminated by a simple two-step process in which the impure calcium carbonate is first dissolved in appropriate fused salt bath and then quenched in water whereby it is obtained as a pure, finely divided precipitate readily adapted to commercial use as a filter or as a pigment.

It is known that dolomite may be decomposed in fused salt media and that the calcium carbonate constituent of the dolomite may be recovered by quenching in water and this procedure is described in a U. S. patent to Booth, No. 2,112,904. In accordance with the patent, the dolomite is contacted with a molten alkali metal chloride or alkaline earth metal chloride or an alkali metal sulfate or with mixtures of these compounds in which the dolomite is decomposed. We have found that this procedure is ineffective for the removal of impurities from the calcium carbonate principally because the calcium carbonate does not dissolve in such fused salts.

In order to effectively purify the calcium carbonate, it is necessary that a fused bath be provided which dissolves substantial amounts of the calcium carbonate. In the course of our investigations, it has been observed that a fused bath composed of suitable alkali metal salts will dissolve calcium carbonate and will not dissolve most of the impurities essentially associated with the naturally occurring mineral deposits containing calcium carbonate. The insoluable impurities, therefore, may be readily separated by a simple decantation in which the clear melt consists essentially of the alkali metal salt and calcium carbonate.

Mixtures of alkali metal compounds were fused as indicated in the table below and solubility of calcium carbonate in the mixtures was determined with the results noted.

TABLE

| Fused bath | Temp., °C. | $CaCO_3$ Dissolved |
|---|---|---|
| 50 grams NaCl, 50 grams KCl | 675 | No solubility. |
| 50 grams NaOH, 50 grams KOH | 615 | 16.8 grams dissolved. |
| 50 grams $Na_2SO_4$, 50 grams $K_2SO_4$ | 850 | No solubility. |
| 50 grams $Na_2CO_3$, 50 grams $K_2CO_3$ | 750 | 52 grams dissolved. |

Thus it will be seen that calcium carbonate is readily soluble in fused alkali metal carbonates, and fairly soluble in alkali metal hydroxides, and that this is in marked contrast with its insolubility in either alkali metal chlorides or alkali metal sulphates.

In the practice of our invention a fused salt bath is formed in which calcium carbonate is soluble in appreciable amounts. To this bath there is then added the material from which the calcium carbonate is to be recovered. It is not essential in our process that the ore should be reduced to a powdered form; and this is an important advantage in our process, resulting as it does in a considerable saving in the cost of preparing the ore. After crushing the ore, it is mixed with an appropriate amount of dry alkali metal carbonate or alkali metal hydroxide or mixtures of the same, and this is fed continuously into the furnace where it falls upon the molten salt bath. The temperature of the molten alkali pool is maintained well above the melting point of the mixture whereby the alkali particles introduced with the ore are melted substantially instantaneously. The temperature of the molten pool should not be permitted to rise to the point where excessive volatilization of the bath components would occur.

The granules or small lumps of ore are dissolved in a short time and sink below the surface almost immediately, forming no local aggregations in the bath. The greater part of the impurities are insoluble in the molten alkalies and sink to the bottom where they may be removed at intervals.

It is quite important that the molten pool should not be agitated to any considerable extent since this would seriously interfere with the separation of the insoluble impurities by gravity. To minimize effect of material introduced into the bath, suitable means may be provided such as baffles, to break the fall of the charge material. In addition it has been found advantageous to dry the charge material to avoid the release of steam in the bath which would stir up the sediment and would impede the proper separation of the liquid from the solid impurities.

Once the calcium carbonate has been dissolved, the clear melt is discharged into a controlled amount of water in which the alkali metal compounds dissolve readily. The calcium carbonate which is relatively insoluble separates out as a finely divided solid. Even when a minimum amount of water is used to dissolve the alkalies, a small amount of calcium carbonate will dissolve in the concentrated alkaline solution, but this is recovered by simply recycling the solution.

The solid calcium carbonate is separated from the alkaline solution by filtration and is washed with water. The filtrate and the washings are evaporated to dryness and heated to remove any water which may be present. The residue will contain the small amount of calcium carbonate which had dissolved in the concentrated alkaline solution as well as the alkalies. The recovered residue is returned to the fused bath along with additional calcium carbonate ore.

In the event that the use of minimum amounts of water is found to result in viscous products which are not readily filtered, more water may be employed, since any dissolved calcium carbonate will ultimately be recovered. This will, of course, increase the amount of heat required to effect the ensuing evaporation.

In order to obtain finely divided calcium carbonate it is necessary to cool the molten salt bath as rapidly as possible. This arrests the crystal growth of the calcium carbonate almost at its inception and as a result, extremely fine particles are produced. We have found that one of the best procedures for rapidly cooling the mass is to discharge the molten bath directly into a body of cold water. Optionally, the water may be agitated to increase the rate of cooling. When a coarser product is desired, the molten salts are cooled more slowly, for example by heating the water into which they are dumped. Thus it is possible to obtain calcium carbonate particles of the size desired.

The following examples will serve to further illustrate the practice of our invention.

*Example I*

Equal parts by weight of $Na_2CO_3$ and $K_2CO_3$ were fused together in a melting furnace maintained at 750° C. When the melt had a clear appearance, indicating that all of the carbonate was molten, calcium carbonate in an amount equal to ½ the weight of the alkali metal carbonates was added to the fused mixture. The bath was maintained at 750° C. for about 15 minutes, during which time the soluble calcium carbonate dissolved and the insoluble impurities settled to the bottom. The resultant limpid melt was poured into a measured amount of water, the amount of water being chosen so as to dissolve the alkali metal carbonate portion of the melt and to provide a minimum in excess of this amount. An extremely fine precipitate of calcium carbonate was obtained which was readily separated from the solution by filtration. The precipitated calcium carbonate was washed with warm water and the wash water was combined with the filtrate. The calcium carbonate was dried and thus recovered in a form particularly suited to use as a pigment or a filler. The calcium carbonate recovered amounted to 98% of the original material. The filtrate and wash water were evaporated to the point where substantially the major portion of the water was eliminated and returned to the furnace for reuse as components of the salt bath.

*Example II*

The process of Example I was repeated except that the fused salt bath to which the impure calcium carbonate was added consisted of a mixture of 50% by weight of potassium hydroxide and 50% by weight of sodium hydroxide maintained at about 625° C. The process was otherwise carried out in the same manner as Example I. The yield of calcium carbonate amounted to 95% of the original material.

While in each of the preceding examples mixtures of alkali metal compounds were employed because of their relatively low melting points, it has been found that a fused bath of a single compound may be used or a mixture of at least one alkali metal carbonate and at least one alkali metal hydroxide. In addition to baths composed solely of alkali metal carbonates and alkali metal hydroxides, it has been found that diluent salts such as alkali metal chlorides, nitrates, etc. may be added to the fused bath either intentionally or as impurities in the crude calcium carbonate, without impairing the yelds obtained, in spite of the insolubility of $CaCO_3$ in such salts.

It will be seen that our process may be operated either batchwise or continuously. In the latter operation a pool of fused material is continuously maintained in the melting furnace and additions of impure calcium carbonate such as limestone, recycled alkali metal carbonates or hydroxides and a small amount of make-up alkali metal carbonates or hydroxides are intermittently added to the bath.

We claim:

1. A process for purifying impure calcium carbonate which comprises: contacting an impure calcium carbonate with a molten bath of at least one alkali metal compound from the group consisting of alkali metal carbonates and alkali metal hydroxides, maintaining the so-formed mixture at an elevated temperature to dissolve the calcium carbonate, decanting the soluble portion of the fused metal into an amount of water at least sufficient to dissolve the alkali metal compounds present and insufficient to dissolve an appreciable portion of the calcium carbonate, whereby the alkali metal compounds present are dissolved and the calcium carbonate is precipitated and separating the precipitated calcium carbonate from the aqueous portion thereby recovering the calcium carbonate as a pure finely divided solid.

2. A process for purifying impure calcium carbonate which comprises: contacting an impure calcium carbonate with a molten bath of at least one alkali metal carbonate, containing the so-formed mixture at an elevated temperature to dissolve the calcium carbonate, decanting the soluble portion of the fused melt into an amount of water at least sufficient to dissolve the alkali metal compounds present and insufficient to dissolve an appreciable portion of the calcium carbonate, whereby the alkali metal carbonates present are dissolved and the calcium carbonate is precipitated and separating the precipitated calcium carbonate from the aqueous portion thereby recovering the calcium carbonate as a pure finely divided solid.

3. A process for purifying impure calcium carbonate which comprises: contacting an impure calcium carbonate with a molten bath of at least one alkali metal hydroxide, maintaining the so-formed mixture at an elevated temperature to dissolve the calcium carbonate, decanting the soluble portion of the fused melt into an amount of water at least sufficient to dissolve the alkali metal hydroxides present and insufficient to dissolve an appreciable portion of the calcium carbonate, whereby the alkali metal hydroxides present are dissolved and the calcium carbonate is precipitated and separating the precipitated calcium carbonate from the aqueous portion thereby recovering the calcium carbonate as a pure finely divided solid.

4. A process for purifying impure calcium carbonate which comprises: contacting an impure calcium carbonate with a molten bath of a mixture of sodium carbonate and potassium carbonate in equal amounts by weight, maintaining the so-formed mixture at an elevated temperature to dissolve the calcium carbonate, decanting the soluble portion of the fused melt into an amount of water at least sufficient to dissolve the alkali metal carbonates present and insufficient to dissolve an appreciable portion of the calcium carbonate whereby the alkali metal carbonates present are dissolved and the calcium carbonate is precipitated and separating the precipitated calcium carbonate from the aqueous portion thereby recovering the calcium carbonate as a pure finely divided solid.

5. A process for purifying impure calcium carbonate which comprises: contacting an impure calcium carbonate with a molten bath of a mixture of sodium carbonate and potassium carbonate in equal amounts by weight, maintaining the so-formed mixture at about 750° C. to dissolve the calcium carbonate, decanting the soluble portion of the fused melt into an amount of water at least sufficient to dissolve the alkali metal carbonates present and insufficient to dissolve an appreciable portion of the calcium carbonate whereby the alkali metal carbonates present are dissolved and the calcium carbonate is precipitated and separating the precipitated calcium carbonate from the aqueous portion thereby recovering the calcium carbonate as a pure finely divided solid.

6. A process for purifying impure calcium carbonate which comprises: melting a mixture of an impure calcium carbonate and at least one alkali metal compound from the group consisting of alkali metal carbonates and alkali metal hydroxides, maintaining the mixture at an elevated temperature to dissolve the calcium carbonate, decanting the liquid portion of the fused melt into an amount of water at least sufficient to dissolve the alkali metal compounds present and insufficient to dissolve an appreciable portion of the calcium carbonate, controlling the particle size of the calcium carbonate precipitated by varying the temperature of the water, and separating the precipitated calcium carbonate from the aqueous solution, thereby recovering the calcium carbonate in pure, finely divided, solid form.

7. A process for purifying impure calcium carbonate which comprises: melting a mixture of an impure calcium carbonate and at least one alkali metal compound from the group consisting of alkali metal carbonates and alkali metal hydroxides, maintaining the mixture at an elevated temperature to dissolve the calcium carbonate in the molten alkali metal constituent, decanting the liquid portion of the fused melt into an amount of water at least sufficient to dissolve the alkali metal compounds present and insufficient to dissolve an appreciable portion of the calcium carbonate, whereby the alkali metal components dissolve and the calcium carbonate is precipitated as a finely divided solid, separating the precipitated calcium carbonate from the aqueous solution, and recovering the values in the aqueous solution by evaporating the solution to dryness and reusing it to treat another batch of impure calcium carbonate according to the foregoing process.

No references cited.